(12) United States Patent
Salim

(10) Patent No.: US 12,328,760 B2
(45) Date of Patent: Jun. 10, 2025

(54) DIRECTIONAL CHANNEL ACCESS SENSING

(71) Applicant: TCL COMMUNICATION (NINGBO) CO., LTD., Zhejiang (CN)

(72) Inventor: Umer Salim, Zhejiang (CN)

(73) Assignee: TCL COMMUNI CATI ON ( NINGBO) CO., LTD., Zhejiang (CN)

( * ) Notice: Subject to any disclaimer, the term of this patent is extended or adjusted under 35 U.S.C. 154(b) by 439 days.

(21) Appl. No.: 18/001,059

(22) PCT Filed: May 7, 2021

(86) PCT No.: PCT/CN2021/092176
§ 371 (c)(1),
(2) Date: Dec. 7, 2022

(87) PCT Pub. No.: WO2021/227956
PCT Pub. Date: Nov. 18, 2021

(65) Prior Publication Data
US 2023/0209597 A1    Jun. 29, 2023

Related U.S. Application Data

(60) Provisional application No. 63/025,065, filed on May 14, 2020.

(51) Int. Cl.
*H04W 74/0808* (2024.01)
(52) U.S. Cl.
CPC .............................. *H04W 74/0808* (2013.01)

(58) Field of Classification Search
CPC .................................................. H04W 74/0808
See application file for complete search history.

(56) References Cited

U.S. PATENT DOCUMENTS

| | | | |
|---|---|---|---|
| 2020/0187250 A1* | 6/2020 | Bhattad | H04W 16/14 |
| 2022/0232546 A1* | 7/2022 | Hakola | H04W 24/08 |
| 2022/0312482 A1* | 9/2022 | Niu | H04W 74/0816 |
| 2022/0322435 A1* | 10/2022 | Chisci | H04W 16/28 |
| 2023/0067905 A1* | 3/2023 | Luo | H04W 72/0446 |

FOREIGN PATENT DOCUMENTS

| | | |
|---|---|---|
| CN | 109565905 A | 4/2019 |
| WO | 2019146986 A1 | 8/2019 |
| WO | 2019210185 A1 | 10/2019 |
| WO | 2020023617 A1 | 1/2020 |

OTHER PUBLICATIONS

International Search Report in International application No. PCT/CN2021/092176, mailed on Aug. 11, 2021.
Written Opinion of the International Search Authority in International application No. PCT/CN2021/092176, mailed on Aug. 11, 2021.

* cited by examiner

*Primary Examiner* — Harry H Kim
(74) *Attorney, Agent, or Firm* — PV IP PC; Wei Te Chung

(57) ABSTRACT

A radio station performs an omni-directional or directional channel access sensing process prior to transmitting, and prior to changing beam direction during a channel occupancy time performs a directional channel access sensing process in the direction of the new beam.

18 Claims, 2 Drawing Sheets

DIRECTIONAL CHANNEL ACCESS SENSING

CROSS REFERENCE TO RELATED APPLICATIONS

This application is a US national phase application based upon an International Application No. PCT/CN2021/092176, filed on May 7, 2021, which claims the priority of U.S. Provisional Patent Application No. 63/025,065, entitled "Directional Channel Access Sensing", filed on May 14, 2020, the contents of which are incorporated herein by reference in their entirety.

FIELD OF DISCLOSURE

The following disclosure relates to channel access sensing, and in particular to such sensing performed prior to directional transmissions.

BACKGROUND

Wireless communication systems, such as the third-generation (3G) of mobile telephone standards and technology are well known. Such 3G standards and technology have been developed by the Third Generation Partnership Project (3GPP)®. The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE)® system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

The NR protocols are intended to offer options for operating in unlicensed radio bands, to be known as NR-U. When operating in an unlicensed radio band the gNB and UE must compete with other devices for physical medium/resource access. For example, Wi-Fi®, NR-U, and LAA may utilise the same physical resources.

Listen-before-talk (LBT) is adopted as the type of channel access procedure for unlicensed operation in 3GPP design, whereby a radio transmitter is required to apply a clear channel assessment (CCA) check prior to transmission. CCA involves at least energy detection (ED) over a time duration with a certain threshold (ED threshold) to determine if a channel is occupied or is clear. If the channel is occupied, random back-off within a contention window applies, so that there is a minimum time duration where the channel is clear before the transmitter can transmit. This also creates randomness among multiple contending devices and thus avoid collisions. In order to protect Wi-Fi ACK transmissions, a defer period (e.g. 43 μs for best effort traffic) is applied after each busy CCA slot before resuming back-off. After the transmitter has gained access to the channel, the transmitter is only allowed to transmit for a limited duration referred to as the maximum channel occupancy time (MCOT). To provide differentiation to channel access priorities based on the type of traffic served (e.g. VoIP, video, best effort, or background), four LBT priority classes are defined with different contention window sizes (CWS) and MCOT, as set out in Section 4.1.2 of TS37.213. A parameter, mp, is used to compute the defer duration when the channel is found to be busy and results in longer defer periods for lower priority classes.

A single sensing slot or CCA slot has been defined to have a duration of 9 micro seconds for 6 GHz, and 5 micro seconds for 60 GHz unlicensed spectrum by the regulatory bodies. Further it is specified a certain duration within a sensing slot over which the energy detection needs to be performed.

Type 1 downlink channel access procedures are performed by a base station (eNB/gNB) where the time duration spanned by the sensing slots that are sensed to be idle before a downlink transmission(s) is random. In addition, whenever the channel is found to be busy, the base station will back-off with the defer duration corresponding to the channel access priority class in use. Type 1 procedures are basically used to initiate channel access for most data transmissions.

Type 2 downlink channel access procedures are performed by a base station (eNB/gNB) where the time duration spanned by sensing slots that are sensed to be idle before a downlink transmission(s) is deterministic. These are mostly used for data transmission when the channel access has been established a-priori by the same base station or a UE. Such channel access is also permitted for short duration control signaling transmission, such as discovery burst.

Similar to downlink Type 1 and Type 2 channel access, uplink Type 1 and Type 2 channel access procedures have been defined, where a UE will perform a channel access with random or deterministic duration respectively.

Beam-based operation has been proposed for the NR protocols such that the base station can transmit on up to 64 beams in different directions. Beam-forming is particularly attractive when operating at higher transmission frequencies due to the higher path losses. For example, there is significant unlicensed spectrum in the 60 GHz region.

The disclosure below relates to various improvements to cellular wireless communications systems.

SUMMARY OF DISCLOSURE

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The invention is described in the following detailed description with reference to the drawings.

There is provided a method of channel sensing performed by a first radio station in a cellular communications network, the first radio station being capable of beam-forming transmissions, wherein the method comprises the steps of at the first radio station performing a first channel sensing process prior to a transmission, wherein a successful first channel sensing process acquires a transmission channel for a channel occupancy time, the first channel sensing process being selected from an omni-directional and a directional channel sensing process; transmitting first signals from the first radio station to a second radio station utilising the transmission channel; prior to expiry of the channel occupancy time, at the first radio station performing a directional channel sensing process, wherein the directional channel sensing process is performed in the direction of a new beam on which the first radio station intends to transmit; and after a successful directional channel sensing process transmitting second signals from the first radio station to a second radio station utilising the new beam.

There is also provided a method of channel sensing performed by a first radio station in a cellular communications network, the first radio station being capable of beam-forming transmissions, wherein the method comprises the steps of at the first radio station performing a first channel sensing process prior to a transmission, wherein a successful first channel sensing process acquires a transmission channel for a channel occupancy time, the first channel sensing process being selected from an omni-directional and a directional channel sensing process; transmitting signals from the first radio station to a second radio station utilising the transmission channel; at the second radio station, prior to expiry of the channel occupancy time performing a directional channel sensing process, wherein the directional channel sensing process is performed in the direction of a new beam on which the second radio station intends to transmit; and transmitting signals from the second radio station utilising the new beam.

The choice of omni-directional or directional channel sensing process may be defined by a system configuration.

The first channel sensing process may be an omni-directional channel sensing process.

The first channel sensing process may be a directional channel sensing process performed in a direction of a first beam with which the first radio station intends to transmit the first signals; the first beam direction being different to the new beam direction.

The first channel sensing process may be an omni-directional process performed one or more times to attempt to acquire the channel, the method further comprising a further first channel sensing process which is performed if the first channel sensing process does not acquire the transmission channel, wherein the further first channel sensing process is a directional channel sensing process.

The first and/or second channel sensing process may use a random back-off.

The first and/or second channel sensing process may use a random duration.

The first and/or second channel sensing process may use a deterministic duration.

The first and/or second channel sensing process may use a deterministic duration, unless the gap between transmissions on the beam which will be used if the channel access procedure acquires the transmission channel exceeds a threshold, in which case a random duration is utilised.

The duration may be dependent on the gap between transmissions on the beam which will be used if the channel access procedure acquires the channel.

The first and/or second channel sensing process may utilise an energy detection threshold based on the maximum effective isotropically radiated power in any beam direction of the radio station performing the sensing process.

The transmission on the new beam may end at the latest at the expiry of the channel occupancy time started by the first channel sensing process.

The first and second channel sensing processes may be Listen Before Transmit processes.

The first radio station may transmit information regarding the first and/or second channel sensing process.

The information may indicate if the first channel sensing process was an omni-directional or a directional process.

The first radio station may be a base station.

The first radio station may be a UE.

There is also provided a base station and a UE configured to perform the methods described herein.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Those skilled in the art will recognise and appreciate that the specifics of the examples described are merely illustrative of some embodiments and that the teachings set forth herein are applicable in a variety of alternative settings.

Figure 1:
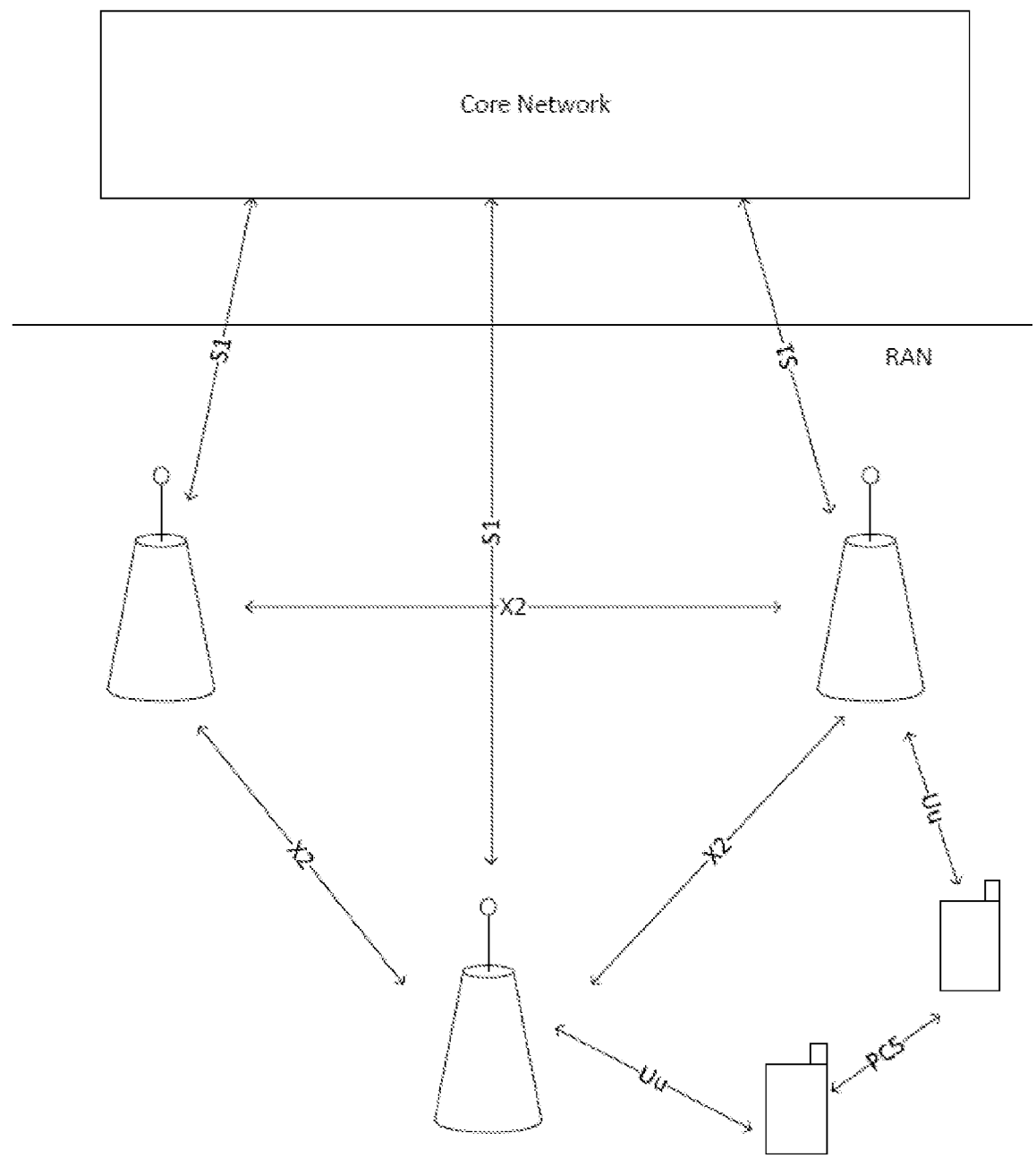
FIG. 1 shows selected elements of a cellular communications network.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. A PC5 interface is provided between UEs for SideLink (SL) communications. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

Figure 2:
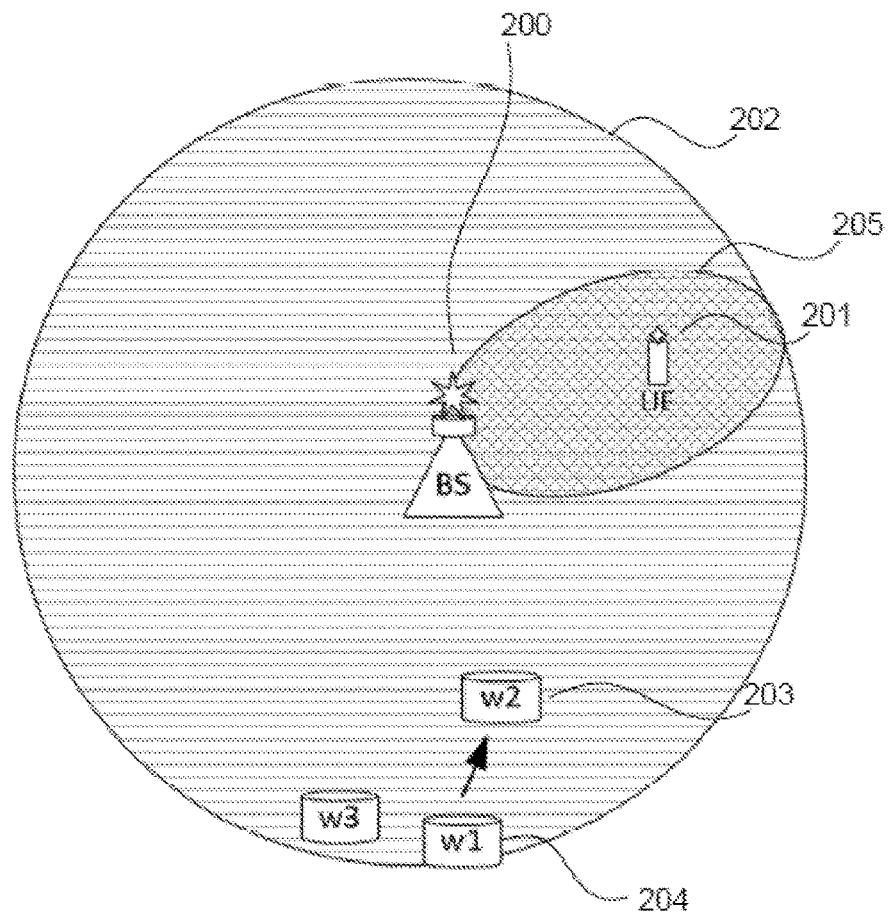
FIG. 2 shows a base station and a UE with a directional transmission.

Conventional channel access procedures utilise omni-directional sensing to determine whether the channel is occupied. However, as shown in FIG. 2 this may be inefficient for systems utilising beam-forming. A base station 200 intends to transmit in unlicensed spectrum to UE 201 and hence performs an omni-directional channel access procedure to detect transmissions within region 202. That procedure will detect transmissions between devices 203, 204 which may be, for example Wi-Fi devices. Those transmissions will block the base station 200 from transmitting even though they would not overlap with the beam-based transmission 205 directed to UE 201.

This difficulty is exacerbated as there will typically be gaps in a transmitter's transmissions even within an acquired COT period. The transmitter must perform a further channel access procedure before re-starting transmissions after the gaps which presents an opportunity for further transmissions to be blocked by other devices such as 203, 204 which may have commenced transmitting after the initial channel access procedure was performed. The transmission to UE 201 is again blocked even though the devices 203, 204 do not affect the transmission beam 205.

Set out below are systems intended to improve channel access for beam-based transmission systems. As explained in more detail below, three principal processes are disclosed for use with beam-forming transmissions. In first type of process a base station initiates channel access with an omni-directional channel access procedure (for example an LBT process detecting all transmissions in any direction). However, if the base station then wishes to change to a different beam during the COT the base station performs a directional channel access procedure to check the direction of the new beam is clear. In a second type of process the base station performs a directional channel access procedure both when initiating channel access and when switching beams. In this second type of process the first transmission of the base station in a particular beam direction will use a random back-off duration independent of whether it is starting a new COT or a change of direction within the COT. In a third type of process the base station has the choice of an omni-directional or directional channel access procedure when initiating channel access. The choice may be dependent on regulations or system configuration and traffic requirements. The use of directional channel access procedures may give the device an unfair advantage for access to a channel compared to systems which only use omni-directional channel access procedures (for example Wi-Fi), and hence it may be preferable not to use direction channel access procedures in every situation.

Uplink (UL) transmissions from a UE to a base station may also use beam-forming and processes are also disclosed for such transmissions. In a first type of process a UE may perform a directional LBT in the direction of its intended transmission beam prior to initiating transmission.

Also set out below are processes for sharing channel occupancy from an initiating device to other devices in the network. Immediate transmissions may not be supported when the channel occupancy is shared from a base station to a UE or from a UE to a base station for a COT initiated with a directional LBT, even if the gap between the switched transmissions is below the regulatory immediate transmission threshold of, e.g., 16 microseconds. Hence, sharing would always be preceded by a directional LBT with a deterministic duration.

As will be appreciated from the following disclosure, features of each of the types may be used in combination or varied as appropriate.

A first type of process for downlink transmissions may be termed Omni-Start, Directional-Switch (OS-DS) channel access. In such a process the initial channel acquisition is preceded by an omni-directional channel access procedure (for example LBT) with random duration and back-off. Within the acquired channel occupancy, prior to every change of beam the base station performs a directional channel access procedure.

Prior to initiating transmissions the base station performs its omni-directional channel access procedure, and if successful starts transmitting during the COT. The omni-directional channel access procedure, used to initiate the COT, has random duration with back-off. This omni-directional LBT is very similar to existing Type 1 based channel access procedures, though underlying parameters for number of sensing slots, contention window and back-off may be adapted with respect to regulations over a given frequency spectrum. The channel access procedure uses an energy detection threshold corresponding to the maximum effective isotropically radiated power in any beam direction. That is, energy detection threshold is selected by taking into account the transmit power that the base station intends to transmit in a beam with combined antenna/panel gain and beamforming gain. When Tx power or gains are different in different beam directions, the procedure is meant to use the energy detection threshold which corresponds to the beam with largest radiated power.

If, during its channel occupancy, the base station intends to change beam direction from a first direction $BD_i$ to a second direction $BD_j$ (i≠j), it performs a directional channel access procedure process in the direction of beam $BD_j$ on which it intends to start transmission. The transmission will only be switched to the new beam if the channel is clear.

The parameters for the channel access procedure on $BD_j$ before switching are dependent on the gap in transmissions in the $BD_j$ direction, not the time between the end of the transmission on $BD_i$ and the start on $BD_j$. The gap between transmissions on $BD_i$ and $BD_j$ may not be a useful metric as the beams are in different directions. In legacy systems transmissions may be re-started without a channel access procedure if the gap in transmissions is less than a threshold, for example 16 microseconds. However, this may not be appropriate when changing beams as even though the channel was occupied by the base station in the $BD_i$ direction, other devices may be occupying the $BD_j$ direction since it was not occupied by the base station. Immediate transmissions after beam switching may therefore not be permitted and a channel access procedure should be required before switching to a new beam.

In summary, when an initiating device switches its transmit beam from a given beam direction $BD_i$ to a different direction $BD_j$ (i≠j) within its channel occupancy, immediate transmissions are not permitted regardless of the gap during the switch; a channel access procedure process is required before transmitting. Although reference is made to beam direction, the same principles apply to other relevant characteristics of the beam. For example, the width or distance of a beam may also be considered a change of direction and hence will also be considered as described for direction.

Different types of channel access procedures may be performed prior to beam switching. In a first type (D1A) the directional channel access procedure is always of a deterministic sensing duration defined by the transmission gap on the relevant beam. Random duration sensing and back-off are not utilised. For example, Types 2A or 2B from TS37.213 may be utilised, or another type in which the sensing period is deterministic and based on transmission gap, and without a random back-off. Deterministic duration is utilised for the directional channel access procedure within the channel occupancy based upon the rationale that the omni-directional channel access procedure was used for initially acquiring the channel. Deterministic channel access procedure Types 2A and 2B are intended for gap durations of up to 25 and 16 microseconds. These gaps, which represent only a few OFDM symbols for large sub-carrier spacing, may be insufficient for beam switching scenarios where typically a beam may be inactive for relatively longer durations. Thus, new longer gap durations and associated (longer) deterministic channel access procedures may need to be defined for use in beam-switching scenarios.

In a second type of directional channel access procedure a deterministic duration or random duration for channel sensing in the intended transmit beam direction may be utilised. If the transmission gap on the new beam is below a threshold the directional channel access procedure is deterministic (e.g. Type 2A, 2B, or other definition with a suitable duration), but if the transmission gap exceeds the threshold the directional channel access procedure uses a random duration channel sensing prior to beam switching (for example Type 1 LBT).

As will be apparent, switching to a new beam does not re-start the COT which continues from the initial channel access acquired through omni-directional random duration channel sensing procedure with back-off. Thus, the base station will perform directional channel access procedures as described above within the channel occupancy prior to every beam switching event and must leave the channel occupancy before the maximum COT duration corresponding to the channel access priority class whose parameters were used as part of omni-directional channel access procedure to initiate the channel access.

The combination of omni-directional and directional channel access procedures offers good co-existence by initiating channel access with omni-directional sensing with other systems which may not utilise directional access procedures, while the use of directional procedures prior to beam switch events avoids interference with devices which have become active in the direction of the new beam after the initial channel access procedure. The directional channel access procedure is intended to provide better channel utilisation by enabling transmissions in a new direction where not other devices are active, but where there are devices in other directions. The use of a purely deterministic duration makes transmissions more deterministic for the base station, whereas using a random duration sensing is expected to improve co-existence.

A second type of process for downlink transmissions may be termed Directional-Start, Directional-Switch (DS-DS) channel access. In this type of process the base station performs a directional channel access procedure both for initiating a channel access and prior to switching beams within the acquired channel occupancy, albeit the parameters and characteristics of the processes may be different. The channel access procedure for initiating the channel access uses random duration with back-off, after which the base station can start transmitting on the beam for which the channel access process was performed. During the subsequent COT, when the base station needs to switch beams, a directional channel access procedure is performed for the direction of the new beam prior to transmission on this beam.

A successful channel access procedure for a given beam direction starts the COT for a maximum duration MCOT, defined according to the channel access priority class whose parameters are used for this directional channel access procedure. For the initial channel access procedure the base station uses a random-duration channel access procedure with back-off. An example set of parameters for defer duration, sensing duration and back-off can be similar to Type 1 (3GPP TS 37.213) which is used for omni-directional channel access procedures in legacy systems. Different parameters or channel classes can be defined to suitably serve new traffic types and other system relevant parameters in beam-based transmissions, particular at higher frequencies.

As noted, prior to beam-switching during the COT from $BD_i$ to $BD_j$, the base station performs a directional channel access procedure in the beam direction $BD_j$ that it intends to transmit. In DS-DS channel access procedure, within an acquired COT, three types of directional channel access procedure, for use prior to beam switching, are discussed immediately below. The particular option may be selected depending on the relative importance of performance and co-existence with other devices/technologies. The choice may be defined by standard, or according to system configuration and parameters.

In a first option, the directional channel access procedure prior to beam switching has always deterministic duration (for example, Type 2A, 2B or other type) where the sensing duration is a function of time gap that the base station has not transmitted in the new beam direction. Existing types 2A and 2B are used for gap durations of up to 25 and 16 microseconds. These gaps, which represent only a few OFDM symbols for large sub-carrier spacing, may be insufficient for beam switching scenarios where typically a beam may be inactive for relatively longer durations. Thus, new longer gap durations and associated (longer) deterministic channel access procedures may need to be defined for use in beam-switching systems.

In a second option the directional channel access procedure prior to beam switching may use a deterministic duration or random duration for channel sensing in the intended beam direction. In this option the first transmission in any beam direction is preceded by a directional channel access with random duration and back-off (for example Type 1 LBT), even when this first transmission happens in the middle of an acquired channel occupancy. When switching to a beam direction for which a random duration back-off LBT process has been conducted in the current COT (i.e. the base station returns to a previous beam), the base station performs a deterministic duration channel access procedure (Type 2A, 2B, or comparable other type), independent of the transmission gap duration for that beam direction.

In a third option prior to beam switching may employ a deterministic duration or random duration directional channel access procedure for channel sensing in the intended beam direction. As a function of time gap that the base station has not transmitted on the given beam direction, this directional channel access procedure for this beam direction can be deterministic (Type 2A, 2B, or some other new length), and if the transmission gap exceeds a given threshold timing, this directional channel access procedure should be with random duration and back-off (for example Type 1 LBT). Therefore, prior to a beam being used for the first time in a COT, or if the transmission gap for the beam is larger than a threshold, a random duration directional channel access procedure is utilised.

Under the DS-DS option any beam direction can be used by the base station at any time with a random duration channel access procedure. As that procedure is used to initiate the COT as well, one may consider the start of new COT with each new beam direction added after a random duration LBT. This may result in new beam directions being added after transmission starts on a first set of beam directions, to which the base station switches transmissions. The COT timer may be re-started again and again with the switching of beam directions. However, the beam directions are not truly orthogonal among neighbouring beams and may spill energy in the spatially adjacent beams. Thus, the other devices in the transmission area may be penalised if channel occupancy is allowed to re-start with a new beam added in a previous channel occupancy.

To avoid this issue the COT may start with the first transmission in any beam direction, and it must end after the relevant CAPC parameters used in the channel access procedure for the first transmission. That is, the COT is not re-started with a beam-switch event within an acquired channel occupancy over the same frequency.

Using directional channel access procedures to initiate channel occupancy is expected to improve base station performance, while such techniques prior to beam-switching are anticipated to improve co-existence. The use of deterministic procedures makes transmissions more deterministic for the base station and it may better schedule its transmissions, where inclusion of random duration channel access procedures may improve co-existence with other devices which may potentially belong to different radio access technologies.

A third type of channel access process for downlink transmissions may be termed Configurable Start-Directional Switch (CS-DS) Channel Access. In this type of process, the base station utilises either an omni-directional or directional channel access procedure with random duration to initiate access to a channel. For example, a base station may initially employ an omni-directional process and if access is successful may commence transmissions and use the first type of process discussed above (OS-DS) for transmissions and beam-switching.

If the omni-directional channel access procedure fails more than a threshold number of times, or the base station determines that it cannot secure channel access with omni-directional processes due to some active devices in a certain direction, the base station may switch to a directional channel access procedure in its preferred beam direction(s). If channel access is successful the base station may continue with the second option (DS-DS) discussed above for continuing transmissions and beam switching.

The switch from omni-directional channel access procedures may be defined by standard or configuration and be dependent on any relevant parameters. For example, the number of attempts before changing may be defined, or a channel occupancy may be specified. When both directional and omni-directional procedures are allowed, the base station may also choose the suitable process as a function of active traffic/transmission requirements.

Similar principles may also be applied to uplink transmissions utilising beams. A UE may need to initiate a channel occupancy if it needs to transmit uplink data in Physical Uplink Shared Channel (PUSCH) as part of dynamic grant or configured grant based scheduling, or it needs to transmit Physical Uplink Control Channel (PUCCH) carrying HARQ feedback or other control information. The UE may perform a directional channel access procedure, with random duration and back-off, for the beam direction in which it intends to transmit if it gains access to the channel. Acquiring channel access with directional sensing procedure may be more appropriate for uplink transmissions since each UE only transmits to the base station in a given direction, whereas in the downlink a base station may be transmitting in multiple directions to different UEs. Therefore, to initiate the channel access over unlicensed spectrum for uplink transmissions, a UE will perform random duration channel access with back-off in the direction that it intends to transmit. This can be similar to uplink Type 1 channel access, albeit directional in nature. Utilising a direction channel access procedure improves the probability of the UE gaining channel access as it will keep its sensing in the direction where it intends to transmits. The ongoing transmissions in other zones/directions are not considered in this sensing procedure, which might otherwise block an omni-directional channel access from the same UE.

A UE may change/refine its uplink transmission beam during the COT. This can occur with a gap on the unlicensed channel if the base station sends a downlink indication on the same unlicensed channel. This can also occur without a gap in case the base station is using a licensed downlink carrier or a different carrier, thus leading to change of UE transmission beam without a gap on the unlicensed carrier. Whenever the UE switches/refines its transmission beam during the COT, it should perform a channel access procedure for the beam to which it is switching. This channel access procedure prior to beam switch within an acquired channel occupancy is of deterministic duration. As an example a 25 micro-second fixed duration LBT may be utilised prior to UE updating/refining its transmit beam.

It may be possible for a UE to determine beam characteristics for a transmission to a base station from a beam used for a transmission in the opposite direction from the base station to the UE (known as beam correspondence). However, channel access procedures should be performed for the direction of transmission, and hence should be performed for an uplink transmission even if the beam details are derived from the downlink transmission beam.

As will be apparent, directional channel access procedures are only beneficial for UEs capable of directional transmissions, and UEs only capable of omni-directional transmission can perform omni-directional channel access procedures. Also, a UE which is capable of beam-forming transmission may not always use the technique and may make omni-directional transmissions, for example where it has insufficient information to define the direction for a beam.

It may be permitted to share channel occupancy acquired by a first device with its responding devices. If there is a gap in this sharing a deterministic duration channel access procedure is applied, but if the gap is less than a threshold (for example 16 micro-seconds ETSI EN 301.893 5 GHz RLAN; Harmonised Standard covering the essential requirements of article 3.2 of Directive 2014/53/EU) an immediate transmission can be made without any channel access procedure.

Figure 3:
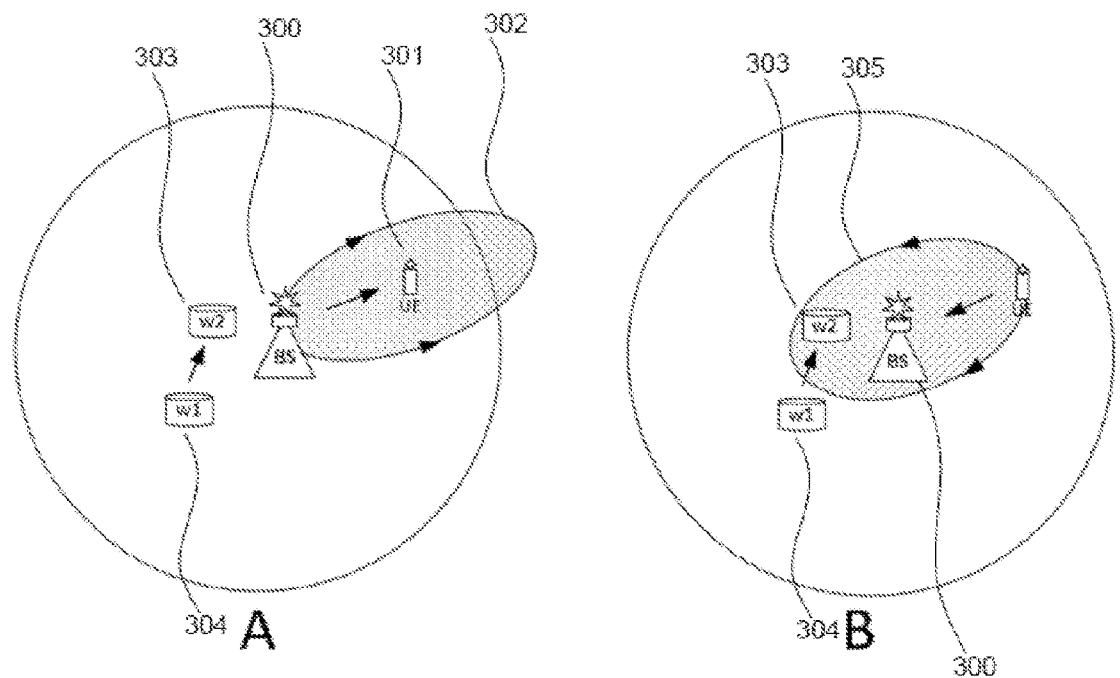
FIG. 3 shows a base station and a UE showing COT sharing.

This principle can raise difficulties for directional transmissions and channel access procedures as shown in FIG. 3. In FIG. 3(A) a base station 300 acquires channel occupancy using a directional channel access procedure for a directional transmission to UE 301. The transmission beam 302 does not overlap devices 303, 304 and hence the base station can proceed with its transmission. However, if UE 301 shares the COT with base station 300 for an uplink transmission to the base station, as shown in FIG. 3(B), the transmission beam 305 may extend beyond the base station 300 and interfere with transmissions between devices 303, 304.

In order to avoid this interference, when sharing COT a responding device should not be permitted to transmit without performing a channel access procedure for the intended transmission, even if the transmission gap is below a threshold. That is, immediate transmissions are not permitted by responding devices when sharing COT, if a directional channel access procedure has been performed to acquire the channel or prior to a beam switching event.

In relation to the above options, if a base station has acquired channel access using the OS-DS approach, immediate transmission by a UE may be permitted to share the COT if the transmission gap is less than a threshold, for example 16 micro-seconds, and the UE shares the COT after the base station transmission in the first beam direction, prior to any beam switch. In OS-DS approach, if UE shares the base station initiated COT in a beam prior to which the base station performed directional channel access, UE is not allowed to do immediate transmission. If the DS-DS approach has been utilised to gain access, immediate transmissions by the UE are not permitted regardless of the gap between transmissions.

In order to permit implementation of these rules, the device initiating channel occupancy may indicate the type of channel access procedure that was utilised to acquire access. In particular, it may be indicated whether an omni-directional or a directional channel access procedure was utilised. This information may be provided selectively to other devices who may share the initiating device's channel occupancy.

When a base station acquires a channel following a channel access procedure and schedules a UE for transmission the base station may indicate to the UE a specific channel access procedure to utilise prior to the scheduled transmission. Therefore, even if the scheduled UE could have started its transmission without a transmission gap on the channel (or a gap less than the threshold for immediate transmission, for example 16 micro seconds), the base station must indicate a channel access procedure with a deterministic duration. This may increase the gap between transmissions on the channel. The base station may transmit a COT sharing indication to UEs in the cell using DCI Format 2_0 (Section 7.3.1.3.1 in 3GPP TS38.212). In legacy systems, the UEs having to transmit PUCCH containing HARQ feedback or other control information, and UEs having periodic configured grants, may use the COT sharing indication to do immediate transmission without a channel access procedure knowing that the UE's base station has the channel occupancy. To share the channel occupancy along with the proposed directional approaches in a meaningful manner, the base station may include, with the COT sharing indication, an indication whether an omni-directional or directional channel access procedure was utilised to gain access to the channel. This information can be included in the COT sharing indication, which can be included in DCI Format 2_0. Based on the indications UEs intending to share the base station COT can decide whether immediate transmission is acceptable, or if a channel access procedure with a deterministic duration should be performed. The type and duration of the access procedure to be performed by the UEs can be defined by specification or configuration.

The same principles apply when a UE acquires channel access and the base station intends to share this channel occupancy. UEs may indicate to the base station the type of channel access procedure (omni-directional or directional) which was performed to gain access to the channel. The UE may transmit this information in the uplink control information transmission, for example over PUSCH or PUCCH depending on transmissions being made by the UE. The base station can utilise the information to determine whether it can use the COT for immediate transmissions or not.

Prior to utilising the UE-acquired COT to transmit control information in the cell, or data for other UEs, the base station chooses a suitable channel access procedure to be done based upon the indication of type of procedure that the UE performed. If the UE acquired the channel through a directional procedure, the base station takes this into account prior to its transmissions within this COT. This depends which strategy the base station is using when it initiates the channel access. If the base station uses OS-DS discussed above, it cannot transmit in a direction other than the UE which acquired the channel without performing an omni-directional channel access procedure. If the base station uses DS-DS, it can extend the COT to other beam directions as per the DS-DS configuration with channel access performed in the beam directions of intended transmissions.

A UE will follow the channel access procedure indicated to it as part of a dynamic grant (DG) downlink control information (DCI), in general. If it so happens that after DG, the UE receives a COT sharing indication from the base station where DG resource falls in the base station indicated COT, the UE may need to update the type of channel access procedure to perform prior to transmission. If the base station has performed an omni-directional channel access procedure, the UE can make an immediate transmission if the transmission gap is less than 16 micro-seconds (or other appropriate threshold). If the base station utilised a directional channel access procedure to initiate a COT (for example if the base station is using the DS-DS scheme discussed above), the immediate transmission on the COT is not supported independent of the gap duration, and the UE will do a deterministic duration channel access procedure, the parameters of which may be part of prior configuration.

For a CG-based transmission, a UE may be configured to initiate the COT with a random duration channel access procedure. If the UE receives a COT sharing indication from the base station which is valid for the CG resource that the UE intends to transmit upon, this implies that the UE transmission will effectively share the base station COT. In this case, the UE will perform a deterministic duration channel access procedure in the direction of its transmit beam with which it intends to transmit on its CG resource. If the UE can determine that the last transmission from the base station prior to UE sharing the COT is preceded by an omni-directional LBT, UE can make immediate transmission without sensing if the gap duration is less than a known threshold (currently 16 micro-seconds).

The choice of energy detection threshold may be important for a channel sensing procedure. The energy detection threshold needs to be updated for directional sensing versus omni-directional (or isotropic) or dipole based sensing. When a device, be it a base station or a UE, employs directional sensing, it needs to update the energy detection threshold taking into account its effective isotropically radiated power with which it intends to transmit on the acquired channel. This means that in addition to its transmit power, it will include all the beamforming, antenna or antenna-panel gains to get a suitable energy detection threshold.

The energy detection threshold could be updated with respect to the angular spread of the beam with which a device intends to transmit after channel acquisition. In this approach, isotropic energy thresholds defined by standards and regulatory bodies may be updated with respect to the beam width of the intended transmission. As an example, if a device intends to transmit in a zone covering only 120 degrees, it can divide the energy detection threshold with a factor 360/120=3 where 360 is the isotropic (omni-directional) spread. This may introduce problems if the device makes very narrow beams to gain an advantage over other devices. To circumvent this problem, different factors may be defined to be used for different angular spreads.

Various methods and processes have therefore been defined to allow use of directional channel access procedures to enable efficient transmission resource sharing in unlicensed spectrum.

As will be apparent the channel access procedures discussed herein may be performed in any appropriate manner, but are typically Listen-Before-Talk (LBT) procedures in which a UE must listen for transmissions for a period to conduct a clear-channel assessment before transmitting.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD)® read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

What is claimed is:

1. A method of channel sensing performed by a first radio station in a cellular communications network, the first radio station being capable of beam-forming transmissions, wherein the method comprises the steps of
  at the first radio station performing a first channel sensing process prior to a transmission,
  wherein a successful first channel sensing process acquires a transmission channel for a channel occupancy time, the first channel sensing process being selected from an omni-directional and a directional channel sensing process;
  transmitting first signals from the first radio station to a second radio station utilising the transmission channel;
  prior to expiry of the channel occupancy time, at the first radio station performing a second channel sensing process,
  wherein the second channel sensing process is performed in a direction of a new beam on which the first radio station intends to transmit,
  wherein the first and/or second channel sensing process uses a deterministic duration,
  wherein the deterministic duration is dependent on a gap between transmissions on a beam which will be used if the first channel sensing process acquires the transmission channel; and
  after the second channel sensing process is successful, transmitting second signals from the first radio station to the second radio station utilising the new beam.

2. The method according to claim 1, wherein the first channel sensing process is a directional channel sensing process performed in a direction of a first beam with which the first radio station intends to transmit the first signals; the first beam direction being different to the new beam direction.

3. The method according to claim 1, wherein the first channel sensing process is an omni-directional process performed one or more times to attempt to acquire the channel, the method further comprising a further first channel sensing process which is performed if the first channel sensing process does not acquire the transmission channel, wherein the further first channel sensing process is a directional channel sensing process.

4. The method according to claim 1, wherein the first and/or second channel sensing process uses a random back-off, or a random duration, instead of the deterministic duration.

5. The method according to claim 1, wherein the first and/or second channel sensing process uses a deterministic duration, unless the gap between transmissions on the beam which will be used if the channel access procedure acquires the transmission channel exceeds a threshold, in which case a random duration is utilised.

6. The method according to claim 1 wherein the first and/or second channel sensing process utilises an energy detection threshold based on the maximum effective isotropically radiated power in any beam direction of the radio station performing the sensing process.

7. The method according to claim 1, wherein the transmission on the new beam ends at the latest at the expiry of the channel occupancy time started by the first channel sensing process.

8. The method according to claim 1, wherein the first radio station transmits information regarding the first and/or second channel sensing process, and the information indicates if the first channel sensing process was an omni-directional or a directional process.

9. The method according to claim 1, wherein the first radio station is a base station or a UE.

10. A method of channel sensing performed by a first radio station in a cellular communications network, the first radio station being capable of beam-forming transmissions, wherein the method comprises the steps of
  at the first radio station performing a first channel sensing process prior to a transmission,
  wherein a successful first channel sensing process acquires a transmission channel for a channel occupancy time, the first channel sensing process being selected from an omni-directional and a directional channel sensing process;
  transmitting signals from the first radio station to a second radio station utilising the transmission channel;
  at the second radio station, prior to expiry of the channel occupancy time performing a second channel sensing process,
  wherein the second channel sensing process is performed in a direction of a new beam on which the second radio station intends to transmit,
  wherein the first and/or second channel sensing process uses a deterministic duration, wherein the deterministic duration is dependent on a gap between transmissions on a beam which will be used if the first channel sensing process acquires the transmission channel; and after the second channel sensing process is successful, transmitting signals from the second radio station utilising the new beam.

11. The method according to claim 10, wherein the first channel sensing process is a directional channel sensing process performed in a direction of a first beam with which the first radio station intends to transmit the first signals; the first beam direction being different to the new beam direction.

12. The method according to claim 10, wherein the first channel sensing process is an omni-directional process performed one or more times to attempt to acquire the channel, the method further comprising a further first channel sensing process which is performed if the first channel sensing process does not acquire the transmission channel, wherein the further first channel sensing process is a directional channel sensing process.

13. The method according to claim 10, wherein the first and/or second channel sensing process uses a random back-off, or a random duration, instead of the deterministic duration.

14. The method of according to claim 10, wherein the first and/or second channel sensing process uses a deterministic duration, unless the gap between transmissions on the beam which will be used if the channel access procedure acquires the transmission channel exceeds a threshold, in which case a random duration is utilised.

15. The method according to claim 10, wherein the first and/or second channel sensing process utilises an energy detection threshold based on the maximum effective isotropically radiated power in any beam direction of the radio station performing the sensing process.

16. The method according to claim 10, wherein the transmission on the new beam ends at the latest at the expiry of the channel occupancy time started by the first channel sensing process.

17. The method according to claim 10, wherein the first radio station transmits information regarding the first and/or second channel sensing process, and the information indicates if the first channel sensing process was an omni-directional or a directional process.

18. A base station configured to perform a method of channel sensing in a cellular communications network, the base station being capable of beam-forming transmissions, wherein the method comprises the steps of at the base station performing a first channel sensing process prior to a transmission, wherein a successful first channel sensing process acquires a transmission channel for a channel occupancy time, the first channel sensing process being selected from an omni-directional and a directional channel sensing process;

transmitting first signals from the base station to a second radio station utilising the transmission channel;

prior to expiry of the channel occupancy time, at the base station performing a second channel sensing process, wherein the second channel sensing process is performed in a direction of a new beam on which the base station intends to transmit, wherein the first and/or second channel sensing process uses a deterministic duration, wherein the deterministic duration is dependent on a gap between transmissions on a beam which will be used if the first channel sensing process acquires the transmission channel; and after the second channel sensing process is successful, transmitting second signals from the base station to the second radio station utilising the new beam.

* * * * *